United States Patent
Morain et al.

(10) Patent No.: US 6,286,542 B1
(45) Date of Patent: Sep. 11, 2001

(54) METHOD AND ARTICLE OF MANUFACTURE FOR INSERTING A LOCATOR WIRE INTO A SUBTERRANEAN, OR OTHERWISE CONCEALED, PRESSURIZED PLASTIC PIPELINE

(75) Inventors: Eldon W. Morain, Broken Arrow; David S. Jordan, Tulsa, both of OK (US)

(73) Assignee: Continental Industries, Inc., Tulsa, OK (US)

( * ) Notice: Subject to any disclaimer, the term of this patent is extended or adjusted under 35 U.S.C. 154(b) by 0 days.

(21) Appl. No.: 09/311,980

(22) Filed: May 14, 1999

(51) Int. Cl.[7] .............................. F16K 43/00; F16L 1/028; E03F 3/06
(52) U.S. Cl. ..................... 137/317; 137/318; 137/553; 405/156
(58) Field of Search .............................. 137/15.01, 15.08, 137/15.11, 318, 355.16, 355.2, 355.26, 553, 317, 355.27; 73/40.5 R, 40.5 A, 49.1; 324/67, 220, 226; 405/154, 155, 156, 157; 251/248, 249.5

(56) References Cited

U.S. PATENT DOCUMENTS

| | | |
|---|---|---|
| 3,878,453 | 4/1975 | Potter et al. ............................ 324/3 |
| 3,905,718 * | 9/1975 | Luckenbill et al. .................. 408/111 |
| 4,272,984 * | 6/1981 | Bell .................................. 73/40.5 R |
| 4,430,613 | 2/1984 | French ................................ 324/200 |
| 4,471,651 * | 9/1984 | Dimeff et al. ..................... 73/40.5 R |
| 4,485,668 * | 12/1984 | Hudson et al. ..................... 73/40.5 A |
| 4,573,829 | 3/1986 | Keene et al. .......................... 405/157 |
| 4,649,948 * | 3/1987 | Hudson ................................ 137/318 |
| 4,682,624 * | 7/1987 | Turner ................................. 137/318 |
| 4,857,851 | 8/1989 | Anderson et al. .................... 324/326 |
| 5,122,750 | 6/1992 | Rippingale et al. ................. 324/326 |
| 5,473,246 | 12/1995 | Philpot ................................ 324/220 |
| 5,612,499 * | 3/1997 | Andrew et al. ...................... 137/318 |
| 5,747,998 | 5/1998 | Fowler et al. ....................... 324/263 |
| 5,896,885 * | 4/1999 | Svetlik ................................. 137/318 |

* cited by examiner

Primary Examiner—George L. Walton
(74) Attorney, Agent, or Firm—Head, Johnson & Kachigian (57) ABSTRACT

An improved method and article of manufacture for introducing a locator wire into an interior portion of a pressurized, or non-pressurized, subterranean or otherwise concealed plastic pipeline. The present invention introduces a locator wire into a plastic pipeline while simultaneously minimizing the escape potential of a transported volume, such as, but not limited to, gas, water, sewerage or oil. A locator wire feeding unit initially feeds the locator wire through a locator wire alignment coupling and proceeds thereafter to project the locator wire through a valve assembly, a locator saddle, and ultimately into a plastic pipe.

1 Claim, 7 Drawing Sheets

METHOD AND ARTICLE OF MANUFACTURE FOR INSERTING A LOCATOR WIRE INTO A SUBTERRANEAN, OR OTHERWISE CONCEALED, PRESSURIZED PLASTIC PIPELINE

REFERENCE TO PENDING APPLICATIONS

This application is not related to any pending applications.

REFERENCE TO MICROFICHE APPENDIX

This application is not referenced in any microfiche appendix.

TECHNICAL FIELD OF THE INVENTION

The present invention is directed to pipe locating equipment and, more particularly, to an improved method and article of manufacture for introducing a locator wire to the interior portion of a pressurized, or non-pressurized, subterranean, or otherwise concealed, plastic pipe.

BACKGROUND OF THE INVENTION

Beginning in the mid-1950's it was a common practice for utility companies, such as gas utility companies, to install plastic pipelines to transport gas to a consumer. In some instances, locating metal wires were installed along with the pipeline to aid in identifying the exact location of a newly laid pipeline. In time, such pipelines became brittle and required repair. Subterranean plastic pipelines buried with locating wires were, and continue to be, fairly easy to locate using magnetic detecting equipment. Plastic pipelines buried without locating wires or with inaccurately placed locating wires are next to impossible to locate with any degree of specificity, as they cannot be mapped via conventional electrical current, or magnetometer detection means.

A "dig-in" is a term used throughout the pipeline industry to refer to the unintentional hitting or breaking of a subterranean pipeline. As the exact location of buried pipelines is often poorly documented, it is estimated that over two million such "dig-ins" occur each year. The danger associated with damaging or breaking a gas pipeline is obvious.

A somewhat less obvious exposure exists for those parties precipitating an unintentional "dig-in", namely, liability exposure. Typically, if a dig-in occurs within two feet of where a utility company indicates a pipeline resides, the cost of pipeline repair and "dig-in" related liability falls upon the excavating party. Should a "dig-in" occur outside of the two foot parameter established by the utility company, the utility company assumes liability and repair responsibility.

Consequently, what is needed is an improved method and apparatus for inserting a locator wire into a pre-existing plastic or other non-metallic based pipeline such that an accurate displacement and location of the pipeline can be assured. Thus, eliminating or greatly reducing the likelihood of inadvertent dig-ins.

BRIEF SUMMARY OF THE INVENTION

An apparatus and methodology to feed a locator wire, or other electrical conductor, into a subterranean, or otherwise concealed, non-metallic based pipeline. It is an objective of the present invention to introduce a locator wire into a plastic pipe while simultaneously minimizing the potential for escape of a transported volume such as gas, water, sewerage or oil. Examples of plastic pipelines include, but are not limited to, polyethylene, polyvinylchloride and fiberglass compositions.

It is another objective of the instant invention to minimize the explosion hazard attendant to gas pipeline detection and repair operations. Within a gas pipeline, minute dust particles transported along with the pipeline's gas volume generate static electricity. The presence of such electricity, in turn, provides for explosion potential during pipeline detection and repair operations. The present invention facilitates the discharge of such static charges by grounding the invention's wire feeding component, in advance of pipeline detection and repair operations.

It is yet another objective of the instant invention to provide for substantial cost savings over pipeline mapping innovations represented by the present art. Such cost savings are made realized in two ways. First, the invention is comprised of inexpensive, durable, materials not prone to damage in the field. Second, and more importantly, the invention eliminates the necessity of installing locator wire during initial pipeline laying operations. That is, the instant invention can be deployed and its locator wire inserted into a plastic pipeline, whenever the exact location of a pipeline section is required. It is estimated that locator wire can be installed at a cost of seven cents per foot when laying a new or replacement pipeline. Consequently, by eliminating the cost of laying locator wire for even a relatively short ten mile pipeline, a cost savings in excess of $3600. would be realized.

A further objective of the instant invention relates to its deployment versatility. Examples of such versatility would be the mapping of non-metallic based sewer lines, water lines, gas lines, or indeed, almost any other plastic pipeline. As the present invention minimizes loss of transported pipeline volume, its practice is equally applicable to pressurized and non-pressurized pipeline scenarios.

Yet another objective of the instant invention is to provide for rapid deployment and ease of use in the field. The instant invention is easily transportable and absent technical, computer or other specialized training requirements. Mapping a pipeline section in a second direction is accommodated simply by retracting any previously fed locator wire, repositioning the direction of the invention's feeding unit and re-feeding the locator wire into the pipeline.

Consequently, given the deficiencies of the present art what is needed is an improved method and article of manufacture for inserting a locator wire into a subterranean, or otherwise concealed, pressurized plastic pipeline. The present invention, in a comprehensive and integrated manner, addresses the afore stated objectives while resolving inadequacies manifested in the present art.

Other objects and further scope of the applicability of the present invention will become apparent from the detailed description to follow, taken in conjunction with the accompanying drawings wherein like parts are designated by like reference numerals.

DETAILED DESCRIPTION OF THE PREFERRED EMBODIMENTS

While the making and using of various embodiments of the present invention are discussed in detail below, it should be appreciated that the present invention provides for inventive concepts capable of being embodied in a wide variety of specific contexts. The specific embodiments discussed herein are merely illustrative of specific manners in which to make and use the invention and are not to be interpreted as limiting the scope of instant invention.

The claims and the specification describe the invention and the terms that are employed in the claims draw their meaning from the use of such terms in the specification. The same terms applied in the prior art may be broader in meaning than specifically employed herein. Whenever there is a question between the broader definition of such terms used in the prior art and the more specific use of the terms herein, the more specific meaning should be assumed.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled. The invention's general features, processing steps and apparatus components are described and disclosed in association with accompanying FIGS. 1 through 12.

While this invention has been described in reference to illustrative embodiments, this description is not to be construed in a limiting sense. Various modifications and combinations of the illustrative embodiments as well as other embodiments of the invention will be apparent to those skilled in the art upon referencing this disclosure. It is therefore intended that this disclosure encompass any such modifications or embodiments.

The present invention is best understood by first reviewing the invention, the invention's components and component configuration relationship(s) as will be discussed and disclosed in FIG. 1. Subsequent to the disclosure provided in FIG. 1, an in depth discussion and disclosure with respect to each invention component will be undertaken and provided in association with FIGS. 2 through 12.

Figure 1:
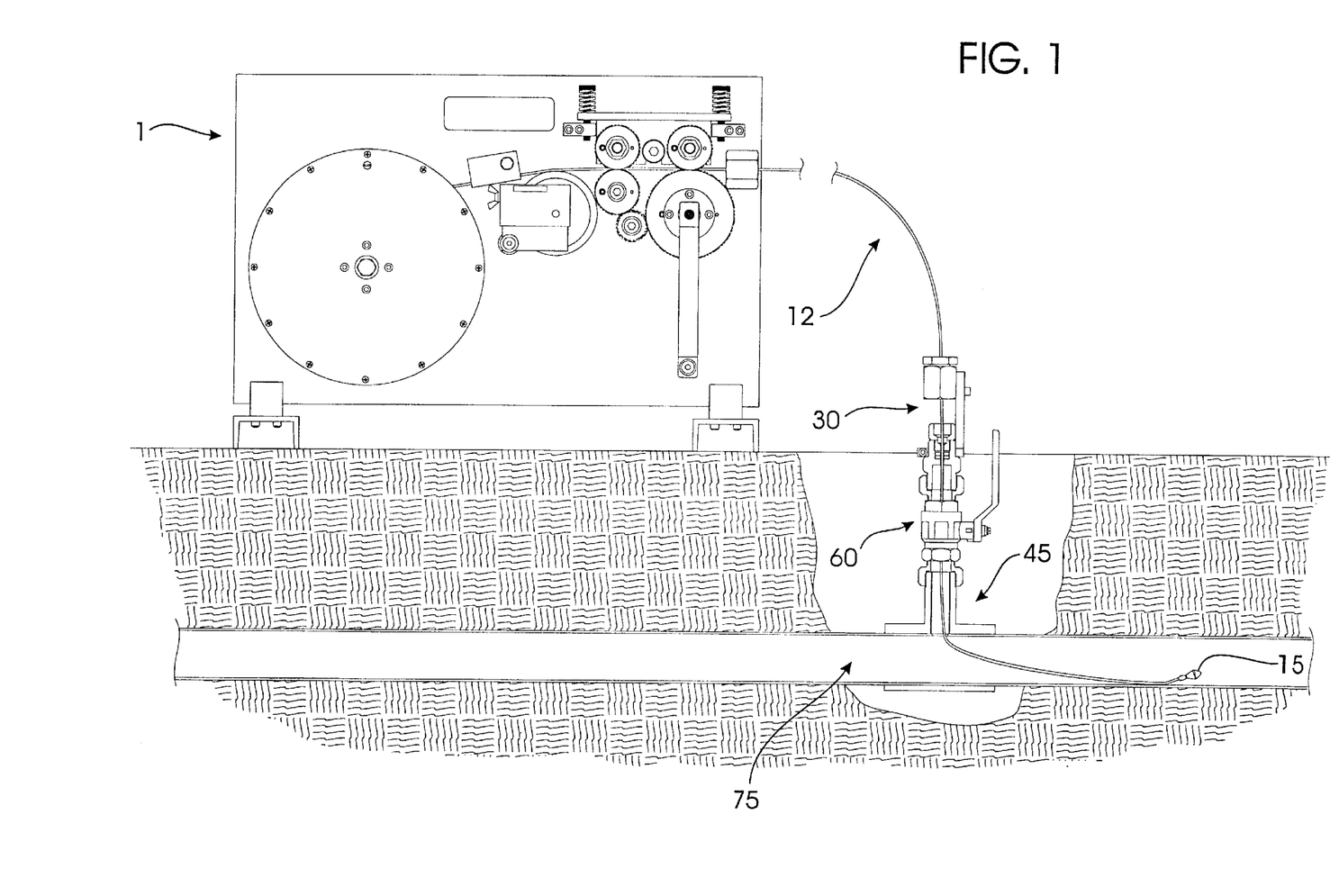
FIG. 1 illustrates hardware components comprising an improved article of manufacture for locating plastic pipe in accordance with the present invention.

Turning now to FIG. 1, FIG. 1 illustrates a major objective of the present invention with respect to its introduction of a metallic based tracing wire, hereinafter referred to as a locator wire 12, into a subterranean, or otherwise concealed, plastic pipe or pipeline 75. It is to be noted that the present invention can be practiced with both pressurized and non-pressurized plastic pipelines, and that such plastic pipelines include, but are not limited to polyethylene, polyvinyl and poly-tec compositions. That is, a major objective of the present invention is to introduce said locator wire 12 into a plastic pipe 75 while simultaneously minimizing the potential for escape of a transported volume, such as, but not limited to, gas, water, sewerage or oil. Consequently, the invention utilizes a valve assembly 60 to minimize loss of such transported volume. FIG. 1 illustrates the locator wire feed unit 1 initially feeding the locator wire 12 through the locator wire alignment coupling 30 and proceeding thereafter through the invention's valve assembly 60, locator saddle 45, and ultimately into the plastic pipe 75. Attention is brought to the unique design of the locator wire nose cone 15 as well as the orientation of the locator wire 12 immediately proceeding attachment to said nose cone 15. The locator wire 12 orientation and locator wire nose cone 15 design, when used in combination as illustrated in FIG. 1, provides for non-impeding travel of the locator wire 12 following introduction to the plastic pipe 75.

Figure 2:
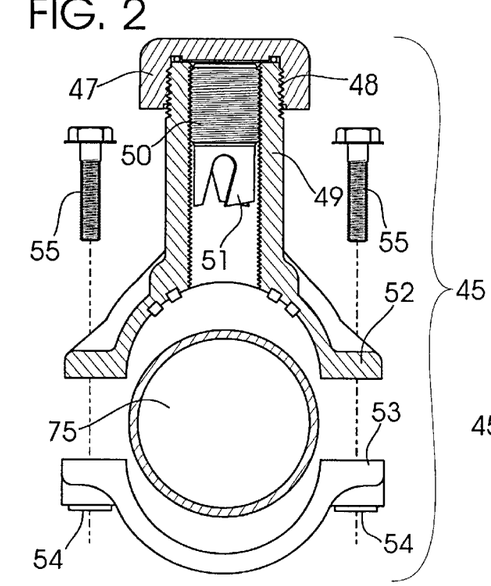
FIG. 2 is an illustration providing additional detail relating to the present invention's locator saddle component.

Turning now to FIG. 2, FIG. 2 provides a detailed exploded illustration of the invention's locator saddle 45. Having once exposed the buried plastic pipe 75 and having cleaned said pipe's outer surface, the next step in deploying the present invention is to attached the invention's locator saddle 45 to the plastic pipe 75. The invention's locator saddle 45 is comprised of two halves: a locating saddle bottom unit 53; and a locating saddle upper unit 52. Having determined a preferred site for locator wire 12 insertion, the locator saddle upper unit 52 and lower 53 are positioned around the plastic pipe 75 and secured via insertion of locating saddle bolt connectors 55 inserted and threaded through locator saddle coupling apertures 54. The next step in the invention's deployment is the tapping of the plastic pipe 75 by way of the invention's coupon retaining cutter 51 housed within the interior of the locator saddle tower 49.

To employ the invention's coupon retaining cutter 51, the locator saddle cap 47 is removed and a threaded drive mechanism 50 is thereby exposed. The exposed threaded drive mechanism 50 is used to transport the coupon retaining cutter 51 downward through the internal portion of the locating saddle tower 49 into, and through, the plastic pipe 75. A driving mechanism to thread the coupon retaining tower cutter 51 down the internal portion of the locating saddle tower 49 is illustrated and further discussed in FIG. 3.

Figure 3:
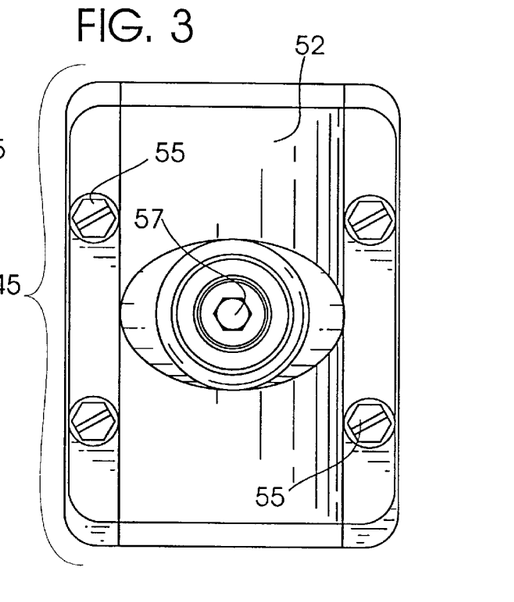
FIG. 3 is an illustration providing an overhead view of additional detail relating to the present invention's locator saddle component.

FIG. 3 illustrates an overhead view of the invention's locator saddle 45, and reveals the locator saddle's broached hexed driver receptacle 57. The broached hexed driver receptacle 57 is rotated in a clockwise motion causing threading of the coupon retaining cutter 51 down the interior portion of the locator saddle tower 49 into, and through, the plastic pipe 75. Said clockwise rotation of the broached hexed driver receptacle 57 is accomplished in one of two manners. Should it be deemed appropriate at this stage of the invention's deployment to only tap through the plastic pipe 75, a standard T-Handle tapping tool 102 can be used to rotate the broached hexed driver receptacle 57 as is illustrated and discussed in association with FIG. 4.

Figure 4:
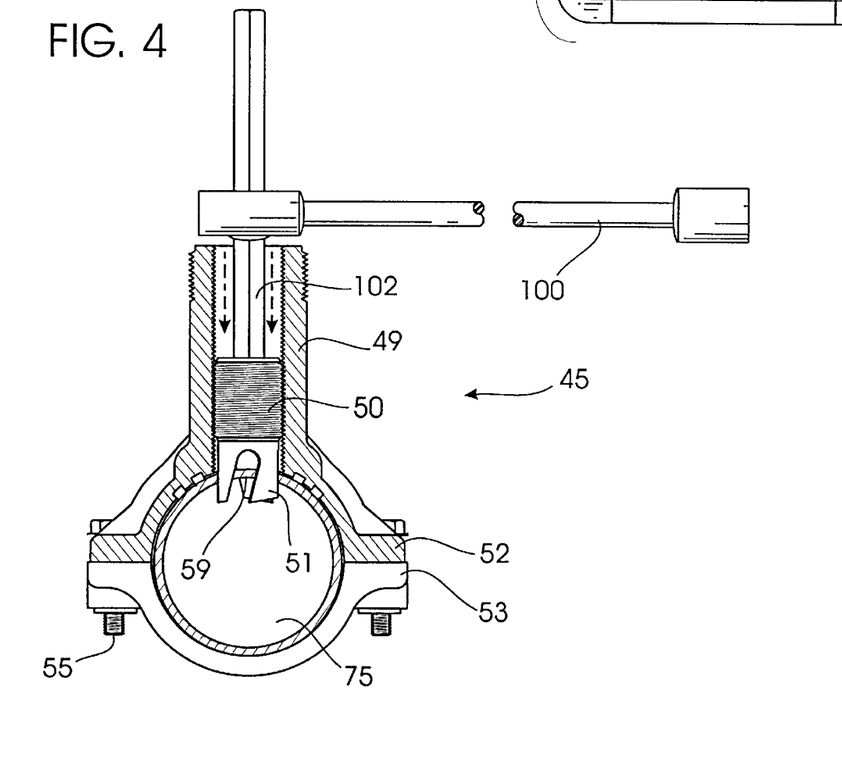
FIG. 4 is an alternative embodiment illustration depicting the tapping of a hole through a plastic pipe in accordance with the present invention.

Turning now to FIG. 4, FIG. 4 illustrates the use of a standard tapping tool 100 to thread the coupon retaining cutter 51 down the internal portion of the locator saddle tower 49 by way of the locator saddle's internal threaded drive mechanism 50. The tapping tool handle 102 is inserted into the broached hexed driver receptacle 57 and turned in a clockwise motion, driving the coupon retaining cutter 51 down the internal portion of the locator saddle tower 49 and ultimately through the plastic pipe 75. Having been driven through the plastic pipe 75, the coupon retaining cutter 51 captures the tapped section of the pipe 59, otherwise referred to as a pipe coupon 59. The coupon retaining cutter 51 is next positioned for subsequent insertion of the locator wire 12. Such positioning is illustrated and discussed in association with FIG. 5.

Figure 5:
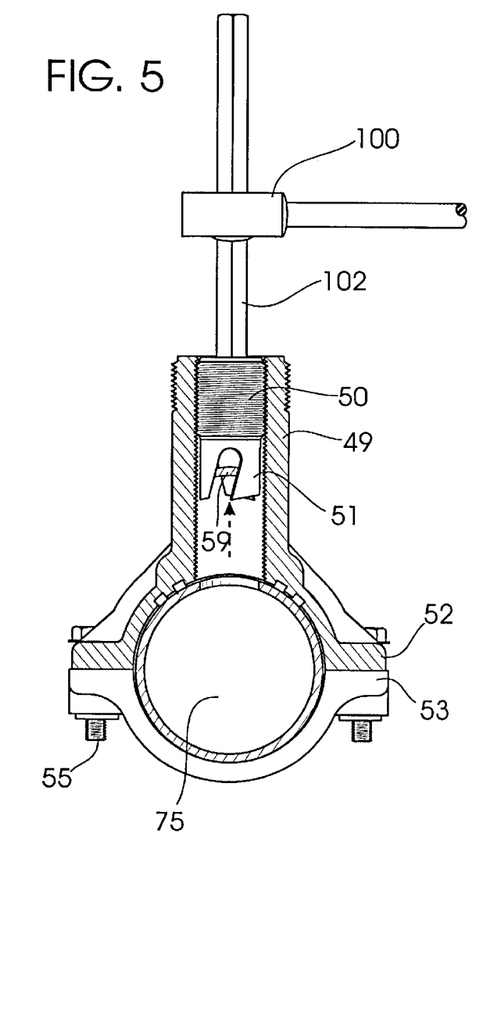
FIG. 5 is an alternative embodiment illustration depicting the positioning of a coupon retaining cutter within a locator saddle in accordance with the present invention.

FIG. 5 illustrates the coupon retaining cutter positioned within the top of the locator saddle tower 49. Such positioning is accomplished by rotating the tapping tool handle 102 in a counterclockwise motion thus retracting the locator saddle internal thread mechanism 50 upward to the desired position within the internal portion of the locator saddle tower 49.

In accordance with the present invention, it is anticipated the tapping of a plastic pipe 75 will occur immediately proceeding the insertion of a locator wire 12. The invention's preferred embodiment addresses this assumption and provides discussion and illustration of this procedure beginning with FIG. 6.

Figure 6:
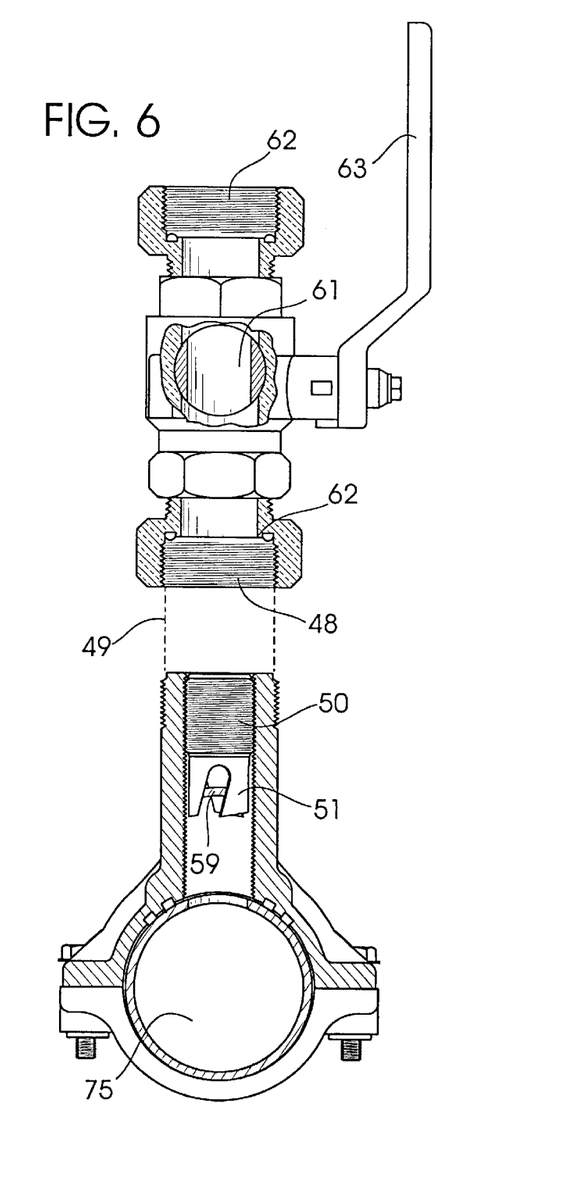
FIG. 6 is an illustration providing additional detail relating to the present invention's valve assembly component.

FIG. 6 illustrates the invention's preferred embodiment with respect to the tapping of a plastic pipe 75. Having affixed the invention's locator saddle 45 to the plastic pipe 75 as described previously, the invention valve assembly 60 is threaded onto the exposed locator saddle external threading connector 48. The internal valve mechanism 61 within the valve assembly 60 is actuated via the movement of the valve assembly handle 63. Typically, movement of the handle 63 downward results in the valve being placed in the closed position. While the valve handle 63 remains in an upright position, the valve will remain in an open condition allowing passage of volume throughout the valve assembly 60. The valve assembly 60 additionally provides for further component attachments, such as a tapping gland tool and a locator wire alignment coupling by way of a valve assembly threaded receptacle 62 located within the uppermost portion of the valve assembly 60. In the preferred embodiment, tapping of the plastic pipe 75 is facilitated via the attachment of a tapping gland tool as illustrated in FIG. 7.

Figure 7:
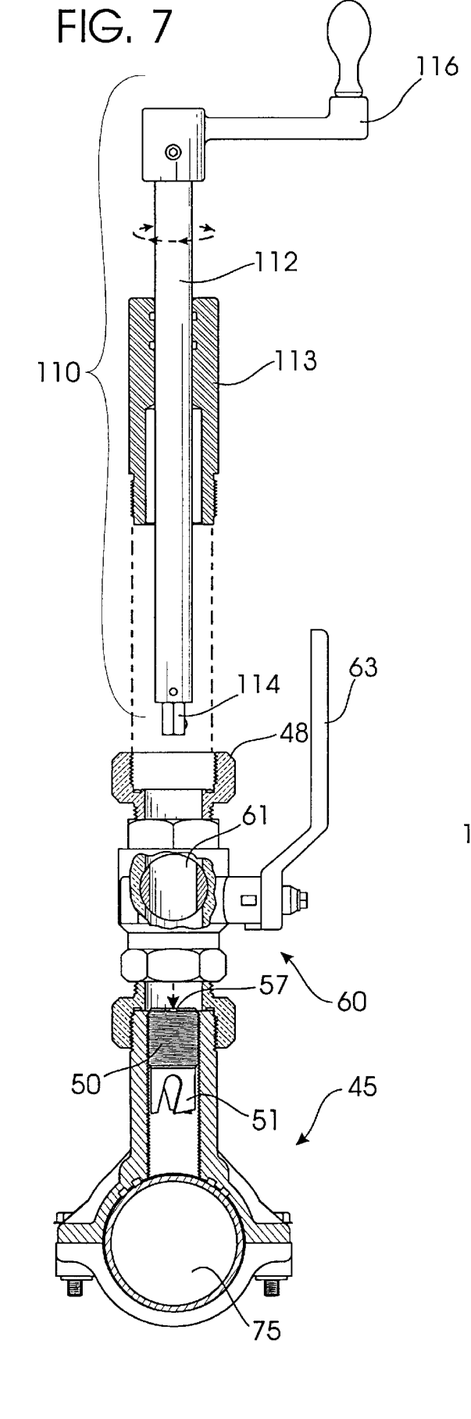
FIG. 7 is an illustration presenting the invention's preferred embodiment for positioning a tapping gland tool prior to tapping a hole through a plastic pipe.

Turning now to FIG. 7, FIG. 7 illustrates a tapping gland tool 110 consisting of a tapping gland tool handle 116, a tapping gland tool shaft 112 and a tapping gland tool hexagon drive component 114 for insertion into the locating saddle broached hexed receptacle 57. The proper method of inserting the tapping gland tool hexagon drive component 114 into the locating saddle broached hexed receptacle 57 is illustrated and discussed in FIG. 8.

Figure 8:
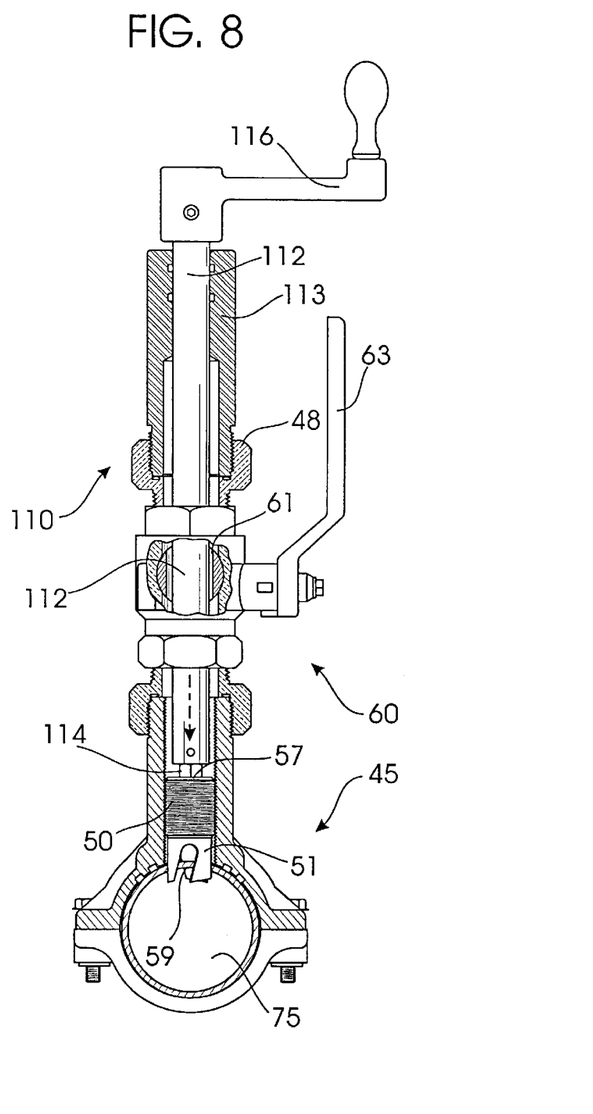
FIG. 8 is an illustration presenting the invention's preferred embodiment for utilizing a tapping gland tool to tap a hole through plastic pipe.
Figure 9:
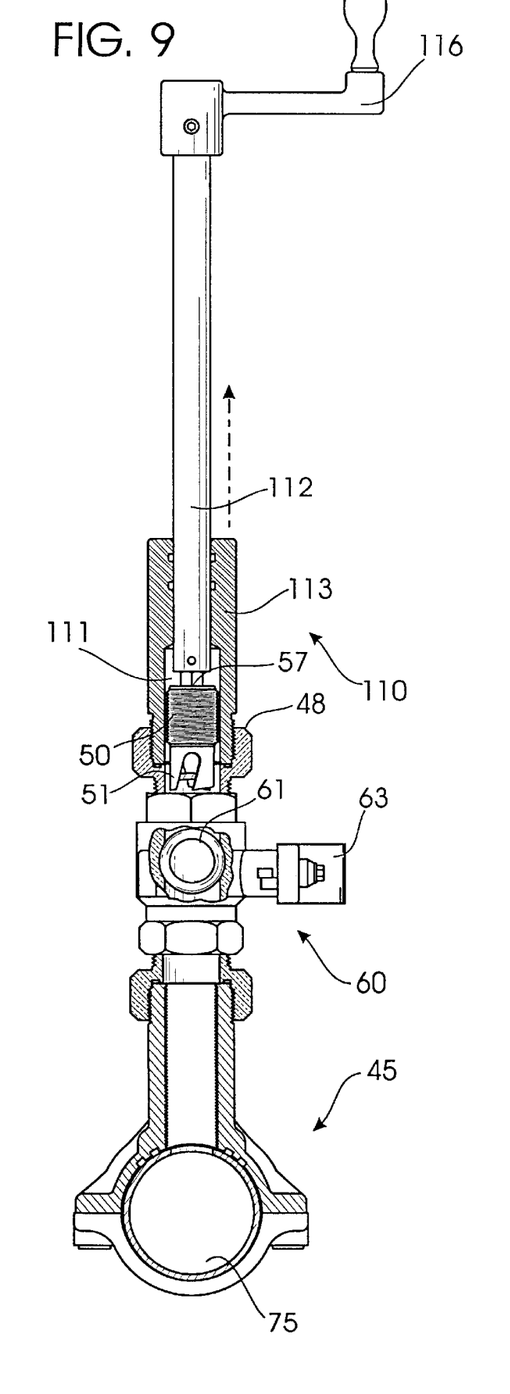
FIG. 9 is an illustration presenting the invention's preferred embodiment for utilizing a tapping gland tool to remove a coupon retainer cutter.

FIG. 8 illustrates the tapping gland tool shaft 112 inserted through the invention's valve assembly 60 and into the broached hexed receptacle 57 of the coupon retaining cutter 51. The tapping gland tool shaft 112 is employed by rotating the tapping gland tool handle 116 in a clockwise direction, thereby threading the locator saddle coupon retaining cutter threaded drive 50 downward and tapping a hole through the plastic pipe 75. When tapping through the plastic pipe 75, the excised section of pipe, referred to as pipe coupon 59, is captured and retained within the coupon retaining cutter 51. To minimize volume loss potential, such as gas escaping subsequent to the tapping operation, the coupon retaining cutter 51 must be positioned properly prior to inserting a locator wire 12 into the plastic pipe 75. Such positioning will be discussed and illustrated in association with FIG. 9. Turning now to FIG. 9.

FIG. 9 illustrates the proper position of the coupon retaining cutter 51 following the tapping of a plastic pipe 75. Having once tapped the plastic pipe 75, the tapping gland tool handle 116 is rotated a counterclockwise direction causing the tapping gland tool shaft 112 to also rotate in a counterclockwise manner and, in turn, causing the coupon retaining cutter 51 to be threaded upward up through the internal portion of the locating saddle tower 49 and past an internal valve mechanism 61 housed within the valve assembly 60. Such coupon retaining cutter positioning prevents the escape of any transported volume from the tapped plastic pipe 75. The tapping gland tool 110 is then removed from the valve assembly 60 in preparation for attachment of the invention's locator wire alignment coupling 30 to the valve assembly 60 as will be discussed and illustrated in association with FIG. 10.

Figure 10:
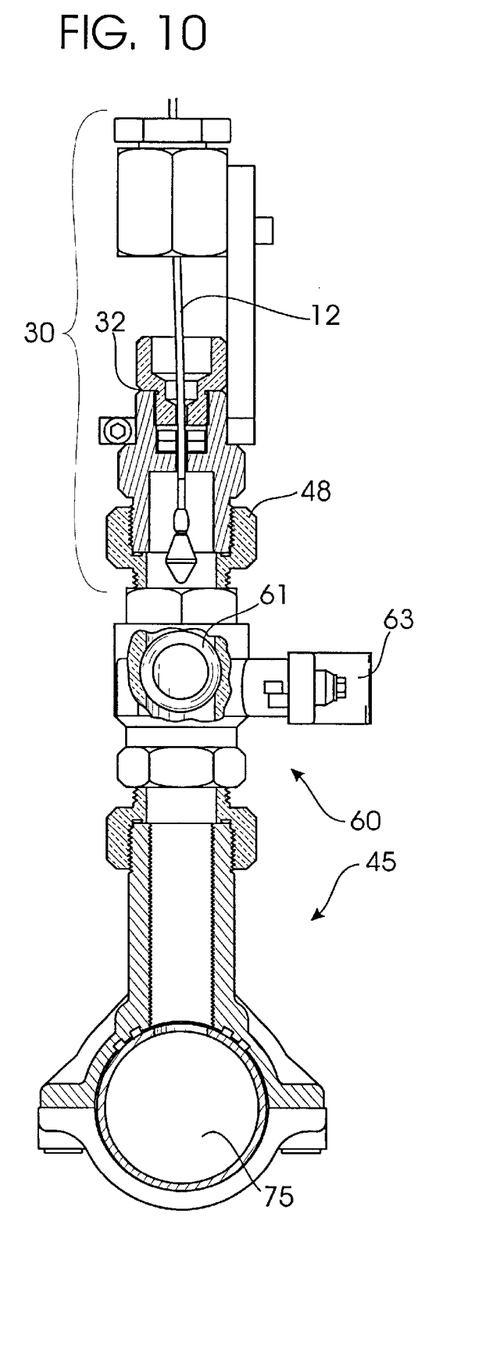
FIG. 10 is an illustration providing additional detail relating to the present invention's alignment coupling component and the positioning of a locator wire within the invention's valve assembly component.

FIG. 10 illustrates the invention's locator wire alignment coupling 30 attached to the valve assembly 60 by way of the valve assembly threaded receptacle 62 located within the uppermost portion of the valve assembly 60. The valve assembly threaded receptacle 62 is exposed as a consequence of having removed the tapping gland tool 110. It is to be noted that the invention's locator wire alignment coupling 30 integrates a locator wire 12. Said locator wire 12 having been previously positioned within the alignment coupling 30 prior to attaching the alignment coupling 30 to the invention's valve assembly 60. Having attached the alignment coupling 30, and thus forming yet a second volume seal 32, the internal valve mechanism 61 within the valve assembly 60 is set to the open position by moving the valve assembly handle 63 upward as will be illustrated and discussed in association with FIG. 11.

Figure 11:
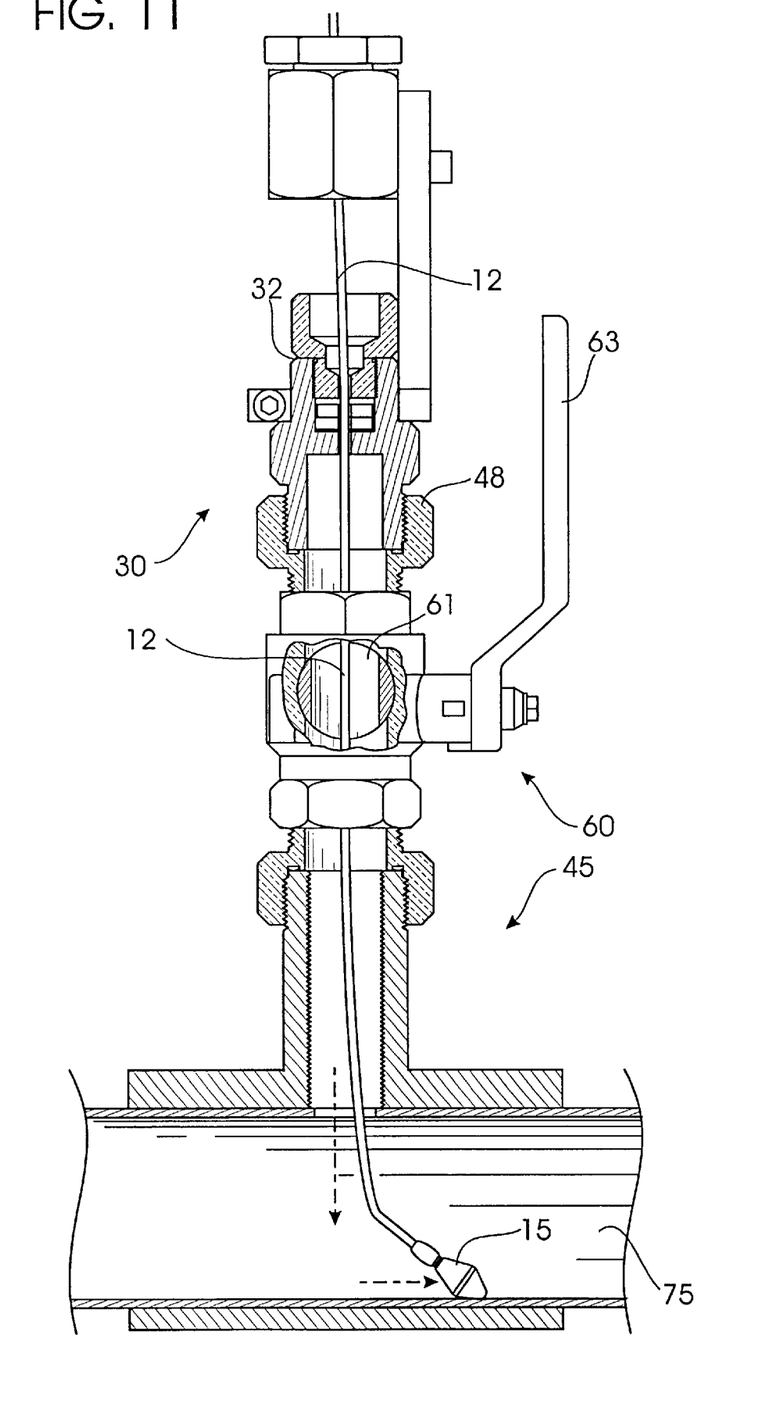
FIG. 11 is an illustration providing additional detail relating to the present invention's alignment coupling component and the insertion of a locator wire within a plastic pipe.

FIG. 11 illustrates the locating wire 12 passing through the valve assembly 60, past the internal valve mechanism 61 through the locator saddle 45, and into the plastic pipe 75. The locator wire nose cone 15 subsequently reaches and strikes the bottom of the plastic pipe 76 at an angle consistent the orientation of the locator wire 12 and locator wire nose cone 15. Having been positioned within the plastic pipe 75, the locator wire 12 is next fed or projected throughout the plastic pipe 75. The invention component responsible for such projection or feeding is the locator wire feed unit 12 as will be discussed and illustrated in association with FIG. 12.

Figure 12:
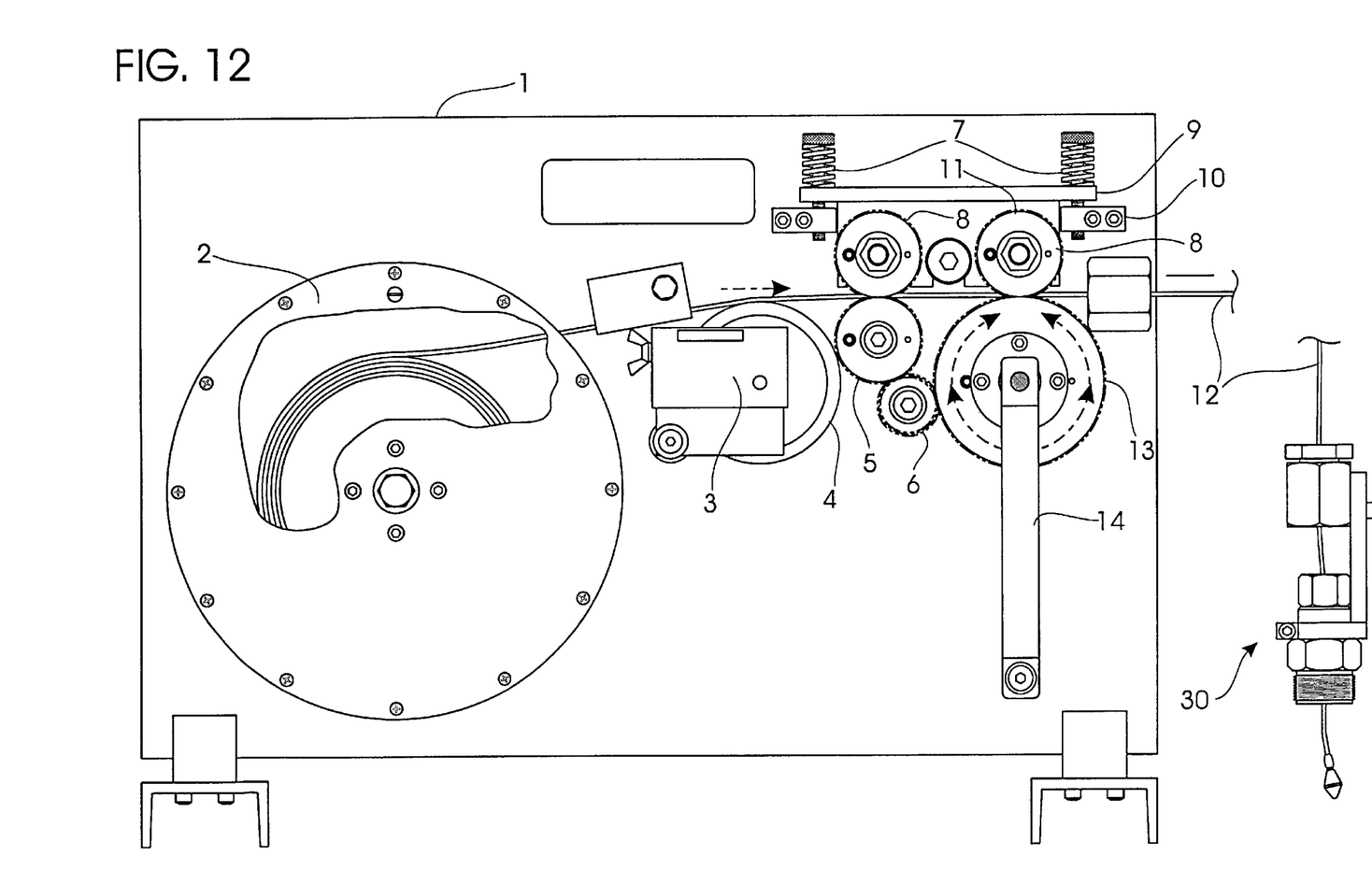
FIG. 12 is an illustration providing additional detail relating to the present invention's locator wire feeding and alignment coupling components.

FIG. 12 illustrates a locator wire projection means manifested as a locator wire feed unit base 1, where a locator wire 12 resides on a locator wire reel 2 and is fed through a lineal counter 3 to measure the extent of deployed wire, over a rubber rim wheel 4, and between a drive spur gear 5 and an adjustable drive gear 8. Projection, or feeding, of the locator wire 12 is initiated by turning the locator wire feed unit crank handle 14 in a clockwise direction. The clockwise turning of said locator wire feed unit crank handle 14, in turn, drives a crank handle drive spur gear 13, which in turn, drives an intermediary spur gear 6 and facilitates movement of the drive spur gear 5, rubber rim wheel 4, and locator wire 12. The invention additionally provides for a clutching mechanism manifested as adjustable gear control screws 7. The clockwise turning of said gear control screws 7 moves an adjustable drive gear bracket 9 downward causing increased pressure to be placed upon a locator wire 12 by the clutching mechanism adjustable drive gear 8. The clockwise turning, or tightening, of said gear control screws 7 allows for greater projection force to be introduced to the locator wire feeding operation. In an opposing manner, projection force is reduced by turning the adjustable gear control screws 7 in a counter-clockwise direction. FIG. 12 also illustrates the pre-integration of locator wire 12 through the alignment coupler 30.

Once a desired length of locator wire 12 has been projected, or fed, into the plastic pipe 75, an electrical current or other appropriate signal can be applied to the locator wire 12 to detect its location, to "map" the subterranean or otherwise hidden pipeline. Alternatively, magnetometer detection may be utilized to locate and "map" the locator wire 12.

What is claimed is:

1. An apparatus for inserting a wire into a pipe comprising:

(a) a locator wire feed unit base;

(b) a locator wire reel connected to said feed unit base;

(c) a locator wire alignment coupling;

(d) a locator wire with a locator wire nose cone affixed thereto via a locator wire nose cone adaptor, said locator wire connecting said locator wire reel and said locator wire alignment coupling;

(e) a locator wire projection means, said projection means comprising in combination a locator wire reel feed unit crank handle attached to said locator wire feed unit base, a crank handle drive spur gear attached to said feed unit crank handle, an intermediary spur gear driven by said crank handle spur gear, a drive spur gear driven by said intermediary spur gear, and a rubber rim wheel driven by said drive spur gear;

(f) a lineal counter to measure extent of locator wire travel facilitated by said locator wire projection means;

(g) a clutching mechanism to increase or decrease wire movement pressure precipitated by said locator wire projection means, said clutching mechanism comprising in combination, at least one adjustable gear mounting block connected to a locator wire feed unit base, an adjustable bracket, at least one adjustable gear screw connecting said adjustable gear mounting block and said adjustable bracket, an adjustable bracket alignment post for aligning said adjustable bracket and at least one adjustable drive gear attached to said adjustable bracket;

(h) a locator saddle; and (i) a valve assembly connecting said locator wire alignment coupling and said locator saddle.

* * * * *